United States Patent
Gayler et al.

(10) Patent No.: US 9,225,205 B2
(45) Date of Patent: *Dec. 29, 2015

(54) METHOD OF CONSTRUCTING CORE WITH TAPERED POLE PIECES AND LOW-LOSS ELECTRICAL ROTATING MACHINE WITH SAID CORE

(71) Applicant: Glassy Metal Technologies Ltd., Norwood (AU)

(72) Inventors: John Andrew Gayler, Brighton (AU); Stephen Robert Kloeden, Gulfview Heights (AU); Nesimi Ertugrul, Paradise (AU); Ryusuke Hasegawa, Morristown, NJ (US)

(73) Assignee: GLASSY METAL TECHNOLOGIES LTD., Norwood (AU)

( * ) Notice: Subject to any disclaimer, the term of this patent is extended or adjusted under 35 U.S.C. 154(b) by 246 days.

This patent is subject to a terminal disclaimer.

(21) Appl. No.: 13/750,317

(22) Filed: Jan. 25, 2013

(65) Prior Publication Data
US 2013/0134825 A1   May 30, 2013

Related U.S. Application Data

(63) Continuation-in-part of application No. 13/212,590, filed on Aug. 18, 2011, now Pat. No. 8,726,490.

(51) Int. Cl.
*H02K 1/06* (2006.01)
*H02K 1/16* (2006.01)
(Continued)

(52) U.S. Cl.
CPC ............... *H02K 1/16* (2013.01); *H02K 15/022* (2013.01); *H02K 15/026* (2013.01); *H02K 15/085* (2013.01); *H02K 15/09* (2013.01); *H02K 15/12* (2013.01); *H02K 21/24* (2013.01); *H02K 2201/03* (2013.01); *H02K 2213/03* (2013.01); *Y10T 29/49009* (2015.01); *Y10T 29/49012* (2015.01)

(58) Field of Classification Search
USPC ........ 310/216.041–216.047, 266, 268, 254.1, 310/261.1
See application file for complete search history.

(56) References Cited

U.S. PATENT DOCUMENTS

| 2,469,808 A | 5/1949 | Aske |
| 3,230,406 A * | 1/1966 | Henry-Baudot .............. 310/155 |

(Continued)

OTHER PUBLICATIONS

International Preliminary Report on Patentability for International Application No. PCT/US12/51307, mailed Sep. 13, 2013.

(Continued)

*Primary Examiner* — Thanh Lam

(57) ABSTRACT

An electrical rotating machine having a stator or a rotor with a core that includes a plurality of tapered pole pieces is a low loss electrical machine that results in improvements such as higher output power, higher torque and higher efficiency than a machine that does not have tapered pole pieces. The stator or the rotor with tapered pole pieces may be applied to a power train in automobiles, power tools, and various appliances. The core is constructed by winding an iron-based amorphous magnetic alloy ribbon to form a cylinder-shaped core, then heating, impregnating with resin, and machining by cutting the cylinder-shaped core to form a plurality of tapered pole pieces being separated in an alternating manner by a plurality of slots. The cores having an outside diameter of 50 mm-1200 mm, a tapered angle of 10°-45°, and a slot depth of 10 mm-210 mm are advantageous.

24 Claims, 11 Drawing Sheets

(51) Int. Cl.
*H02K 15/085* (2006.01)
*H02K 15/09* (2006.01)
*H02K 21/24* (2006.01)
*H02K 15/02* (2006.01)
*H02K 15/12* (2006.01)

(56) References Cited

U.S. PATENT DOCUMENTS

| | | | |
|---|---|---|---|
| 4,142,571 A | | 3/1979 | Narasimhan |
| 4,363,988 A * | | 12/1982 | Kliman .................. 310/268 |
| 4,394,597 A | | 7/1983 | Mas |
| 5,028,830 A * | | 7/1991 | Mas .................. 310/211 |
| 6,445,105 B1 * | | 9/2002 | Kliman et al. ............ 310/268 |
| 6,478,357 B2 | | 11/2002 | Zhou |
| 6,803,694 B2 | | 10/2004 | Decristofaro et al. |
| 8,726,490 B2 * | | 5/2014 | Gayler et al. .................. 29/596 |
| 2009/0230800 A1 | | 9/2009 | Jafoui et al. |
| 2009/0315422 A1 | | 12/2009 | Tu |
| 2010/0148611 A1 * | | 6/2010 | Wang et al. ............ 310/156.37 |
| 2010/0175793 A1 | | 7/2010 | Hasegawa et al. |
| 2011/0156519 A1 * | | 6/2011 | Wang et al. .................. 310/114 |

OTHER PUBLICATIONS

Written Opinion of the International Searching Authority and International Search Report issued Nov. 2, 2012 in corresponding International Patent Application No. PCT/US12/51307.

U.S. Appl. No. 13/212,590, John Andrew Gayler et al., Glassy Metal Technologies Ltd., filed Aug. 18, 2011.

* cited by examiner

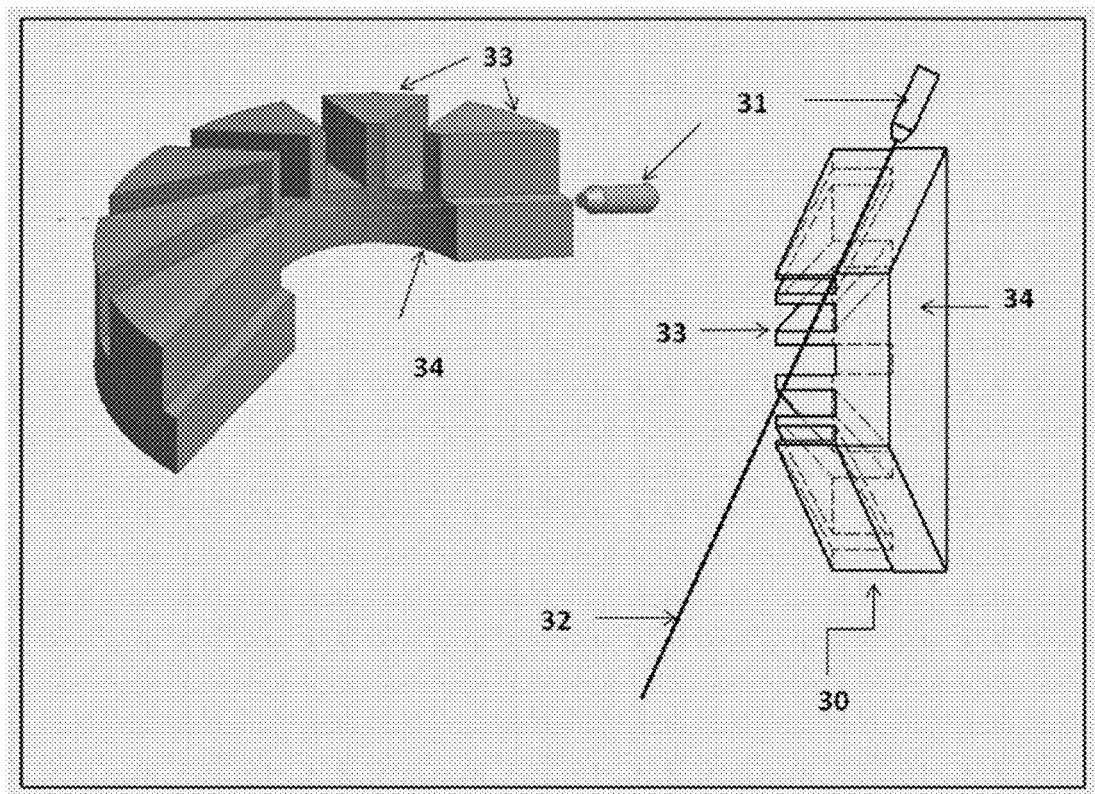

METHOD OF CONSTRUCTING CORE WITH TAPERED POLE PIECES AND LOW-LOSS ELECTRICAL ROTATING MACHINE WITH SAID CORE

CROSS-REFERENCE TO RELATED APPLICATIONS

This application is a continuation-in-part of and claims priority benefit to U.S. application Ser. No. 13/212,590, filed Aug. 18, 2011, entitled "Method of Constructing Core with Tapered Pole Pieces and Low-Loss electrical Rotating machine with Said Core," the contents of which are incorporated herein by reference.

BACKGROUND

1. Field

Embodiments of the invention relates to axial magnetic flux electric rotating machines such as motors and generators, and more particularly to such machines in which flux line penetration between stators and rotors is made more effective than in conventional machines.

2. Description of the Related Art

As described in U.S. Pat. No. 2,469,808, development of axial magnetic flux electrical rotating machines started with a stator core with a pancake design. The inefficient design was changed as described in U.S. Pat. 4,394,597 (hereinafter the '597 Patent). The core configuration taught in the '597 Patent is shown in FIG. 1. The newly designed core could be used either as a stator or a rotor. The core of FIG. 1 is featured with a flat annular surface and slotted section into which electrical conductor windings are placed as shown in FIG. 2. The annular flat surface of the rotor has a counterpart flat surface of a stator arranged in such a manner that the two flat surfaces are parallel, forming an air gap through which, magnetic flux line flows between the rotor and the stator. The magnetic energy from the stator to the rotor is stored in the air gap and is proportional to $B_g^2$, where $B_g$ is the magnetic flux density in the gap. Thus the gap must be as small as possible to maximize $B_g$, as effective $B_g$ decreases with the gap due to leakage flux. However, there is a limit to the smallest gap as the rotor spins while the stator is stationary. Thus a certain amount of the energy stored in the gap is lost, resulting in an energy loss. In addition to the annular core design, the '597 Patent describes the use of an amorphous magnetic alloy as the core material to enhance energy efficiency of the rotating electrical machine. Subsequent development for a better core design is exemplified in U.S. Pat. No. 6,803,694 (hereinafter the '694 Patent). However, the '694 Patent does not provide substantial improvement of the rotating machine efficiency. It is therefore desirable to invent a new core configuration to make the energy transfer better between a rotor and a stator more efficient than the conventional configuration of, for example, FIG. 1. Although the efficiency of the electric rotating machines using amorphous metals is higher than that of the machines based on conventional electric steels, amorphous metals are mechanically much harder than electrical steels, resulting in increased difficulty in machining the amorphous metal-based cores. It is an objective of the present invention to improve the machinability of amorphous metal-based stator and rotor cores and simultaneously to make the magnetic flux flow more effective than in conventional cores.

SUMMARY

Additional aspects and/or advantages will be set forth in part in the description which follows and, in part, will be apparent from the description, or may be learned by practice of the invention.

In accordance with an embodiment of the invention, a method is utilized to construct a core with tapered pole pieces, including: winding an iron-based amorphous magnetic alloy ribbon concentrically to form a cylinder-shaped toroidal core, the core having an outside diameter, an inside diameter, a first flat side, a second flat side, an outer circumference and an inner circumference; heat-treating the cylinder-shaped toroidal core, with or without a magnetic field, at a temperature that is below a crystallization temperature of the ribbon to form a heat-treated core; impregnating the heat-treated core with a resin to form an impregnated core; machining the first flat side of the impregnated core to form a tapered surface so that the outer circumference is being machined to be shorter than the inner circumference, and the tapered surface is at a taper angle that is measured with respect to the first flat side; and machining the tapered surface to form a plurality of pole pieces, each pole piece having a height that is measured on the inner circumference, an outer side diameter, and an inner side diameter, each pole piece being separated in an alternating manner by a plurality of slots, and each slot having a size and a slot depth.

In accordance with an embodiment of the invention, the method of constructing a core with tapered pole pieces alternatively includes winding an iron-based amorphous magnetic alloy ribbon helically to form a cylinder-shaped toroidal core by moving the ribbon with a predetermined pitch along an axis direction of the core, the core having an outside diameter, an inside diameter, a first tapered side, a second tapered side, an outer circumference and an inner circumference.

In accordance with an embodiment of the invention, the method of constructing the core with tapered pole pieces further includes inserting electrical conductor windings into said plurality of slots to form a stator or a rotor; and matching said stator or said rotor with a matching rotor or a matching stator to form an electrical rotating machine.

In accordance with an embodiment of the invention, the outside diameter of the core is in a range of 50 mm-1200 mm, the tapered angle of the tapered surface is in a range of 10°-45°, and the slot depth of the slot is in a range of 10 mm-210 mm.

In accordance with an embodiment of the invention, an electrical rotating machine, including: a stator or a rotor with a core having a plurality of tapered pole pieces, the core having an outside diameter, an inside diameter, a tapered surface, a flat side, an outer circumference and an inner circumference, the tapered surface being at a taper angle that is measured with respect to the orthogonal direction of the core's axis, the plurality of tapered pole pieces being separated in alternating manner by a plurality of slots, each of the plurality of pole pieces having a height that is measured on said inner circumference, an outer side diameter, and an inner side diameter, each of the plurality of slots having a size and a slot depth, and the core is made from an iron-based amorphous magnetic alloy ribbon.

In accordance with an embodiment of the invention, the electrical rotating machine further includes electrical conductor windings having been inserted into the plurality of slot to form a stator or a rotor having the plurality of tapered pole pieces; and a matching rotor or a matching stator with the stator or said rotor having the plurality of tapered pole pieces.

In accordance with an embodiment of the invention, the electrical rotating machine has the outside diameter of the core in a range of 50 mm-1200 mm, the tapered angle of the tapered surface in a range of 10°-45°, and the slot depth of the slot in a range of 10 mm-210 mm.

In accordance with an embodiment of the invention, in the electrical rotating machine, the core has been heat-treated, with or without a magnetic field, at a temperature below a crystallization temperature of the ribbon.

In accordance with an embodiment of the invention, in the electrical rotating machine, the core has been impregnated with a resin.

In accordance with an embodiment of the invention, the electrical rotating machine has a higher output power, a higher torque, and a higher efficiency than a machine that does not have tapered pole pieces.

In accordance with an embodiment of the invention, the electrical rotating machine exhibits advantages that include the higher output power being at least 30%, the higher torque being at least 25%, and the higher efficiency being greater than 75%.

In accordance with an embodiment of the invention, the electrical rotating machine can be used as a power train in an automobile, in an automobile door, in a building wall, in a power tool, in a fluid moving pump, and in an appliance driven by a motor.

BRIEF DESCRIPTION OF THE DRAWINGS

The invention will be more clearly understood by reference to the following detailed description of the invention and the accompanying drawings in which:

FIG. 3A is a drawing showing the water jet cutting process of embodiments of the present invention and the stator core 30 with pole pieces 33 and back-iron 34 of an embodiment of the present invention.

DESCRIPTION OF EMBODIMENTS

Figure 1:
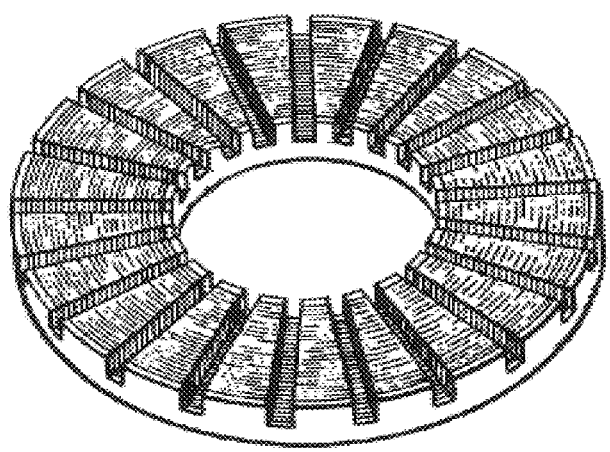
FIG. 1 is a perspective view of a stator or a rotor core configuration having a conventional shape.

Reference will now be made in detail to the embodiments, examples of which are illustrated in the accompanying drawings, wherein like reference numerals refer to the like elements throughout. The embodiments are described below to explain the present invention by referring to the figures.

One of the most advanced soft magnetic materials suited for energy efficient electrical devices, such as transformers and motors, is based on Fe-based amorphous alloys which are commercially available in ribbon forms. One such example is METGLAS®2605SA1 amorphous alloy ribbon. The ribbons are produced by rapid solidification from the melt in accordance with the process described in U.S. Pat. No. 4,142,571. The most effective use of such ribbons is to form magnetic cores by winding or laminating the ribbons. The rapid solidification of molten metal introduces cast-in stress in the resultant ribbon which can be readily relieved by heat-treatment of the ribbon at temperatures below the ribbons' crystallization temperatures.

In the efforts to increase magnetic flux flow between a stator and its matching rotor of an electrical rotating machine, the present inventors found that core configuration with a tapered pole piece surface for a stator or rotor increased the effective surface area through which flux flow takes place during operation of an electrical rotating machine.

Figure 3B:
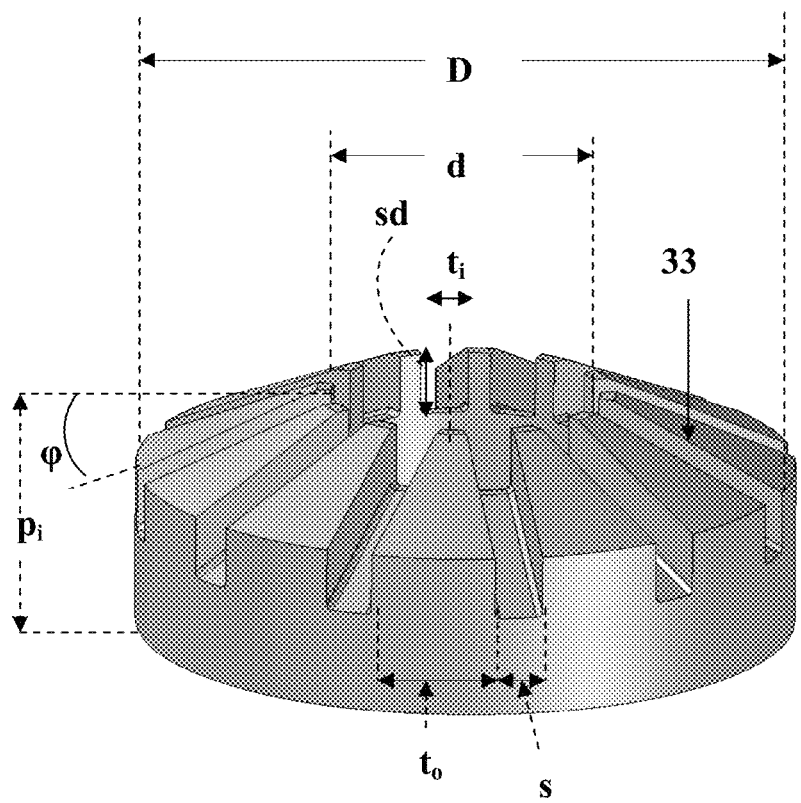
FIG. 3B is a perspective view of a stator or rotor core configuration of an embodiment of the present invention with a pole pieces 33 having a tapered surface.

In accordance with an embodiment of the invention, the method of constructing a core as exemplified in FIGS. 3A and 3B was to wind a toroidal core with an outside diameter D and an inside diameter d with a predetermined height from a commercially available METGALS®2605SA1 amorphous magnetic ribbon to form a cylinder-shaped toroidal core. Then the cylinder-shaped toroidal core was heat-treated at a temperature below the core material's crystallization temperature to remove the as-cast internal stress prior to impregnating the heat-treated core using a commercially available resin, such as epoxy resin. For the case of METGLAS®2605SA1 ribbon, its crystallization temperature is 535° C. Such impregnation was necessary to proceed with subsequent machining of the core to a desired core configuration needed for a core of an electrical rotating machine of the present invention. The impregnated toroidal core was then machined on one flat side of the core to introduce a tapered slope on the flat side. The tapered slope or tapered surface is defined by an angle φ that the tapered slope forms with respect to the horizontal plane as defined in FIGS. 3A and 3B and the angle φ is being predetermined for a particular core.

The tapered side of the core was then machined to form a core with a plurality of pole pieces 33, each pole piece having an outer side dimension $t_o$ and an inner side dimension $t_i$, with the plurality of pole pieces being separated by a plurality of slots, each slot having a slot width s and a slot depth sd on the inner circumference of the core. The machining was performed by an abrasive water jet cutting as described in Example 1. Each pole piece has a height $p_i$ that is measured on the inner circumference of the core, and the height $p_i$ is predetermined for a particular core. The relationship among D, d, $t_o$, $t_i$, and s were such that:

$$2n=\pi D/(t_o+s)=\pi d/(t_i+s),$$

where 2n was the total number of pole pieces which was predetermined.

Figure 4:
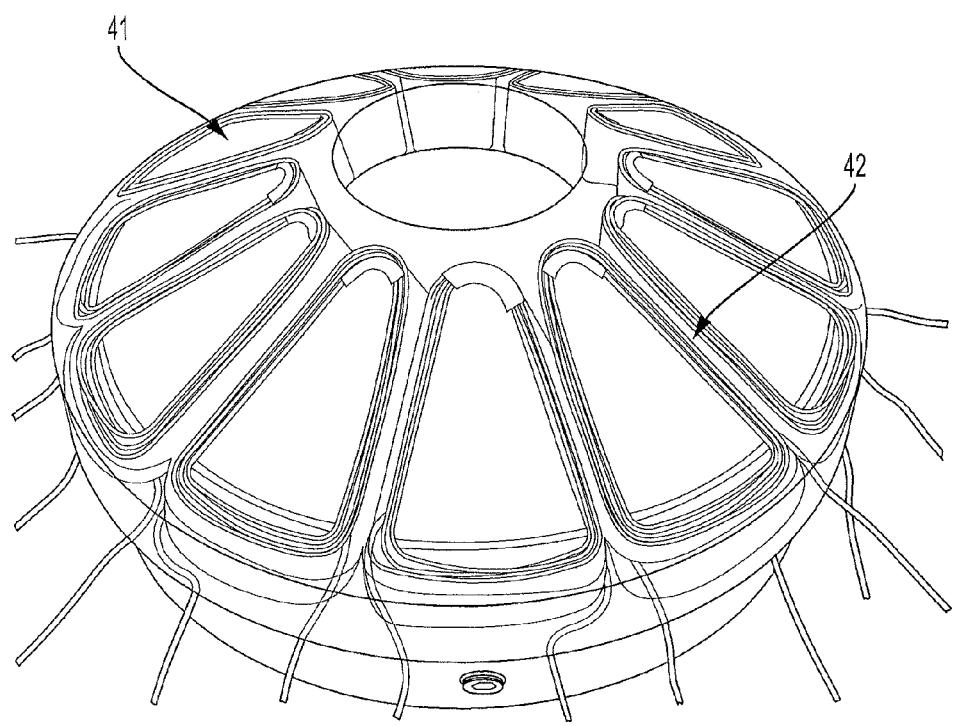
FIG. 4 is a photograph of a stator core of an embodiment of the present invention as depicted in FIG. 3B, with an electrical conductor winding 42 and a pole piece 41.

In accordance with an embodiment of the invention, alternatively, the method of constructing a core includes winding an amorphous metal ribbon helically by moving the ribbon with a predetermined pitch along the core's axis direction to a predetermined tapered core surface configuration, followed by heat-treatment of the core, core impregnation, slot formation and core surface machining. When the machining of the core was completed, slots between two pole pieces of pole pieces 41 were filled with electrical conductor windings 42 for the core's magnetic excitation as indicated in FIG. 4. The finished core of FIG. 4 served as a stator core-coil assembly of one embodiment of the present invention. A matching rotor core, not shown in FIG. 4, was constructed separately.

Figure 2:
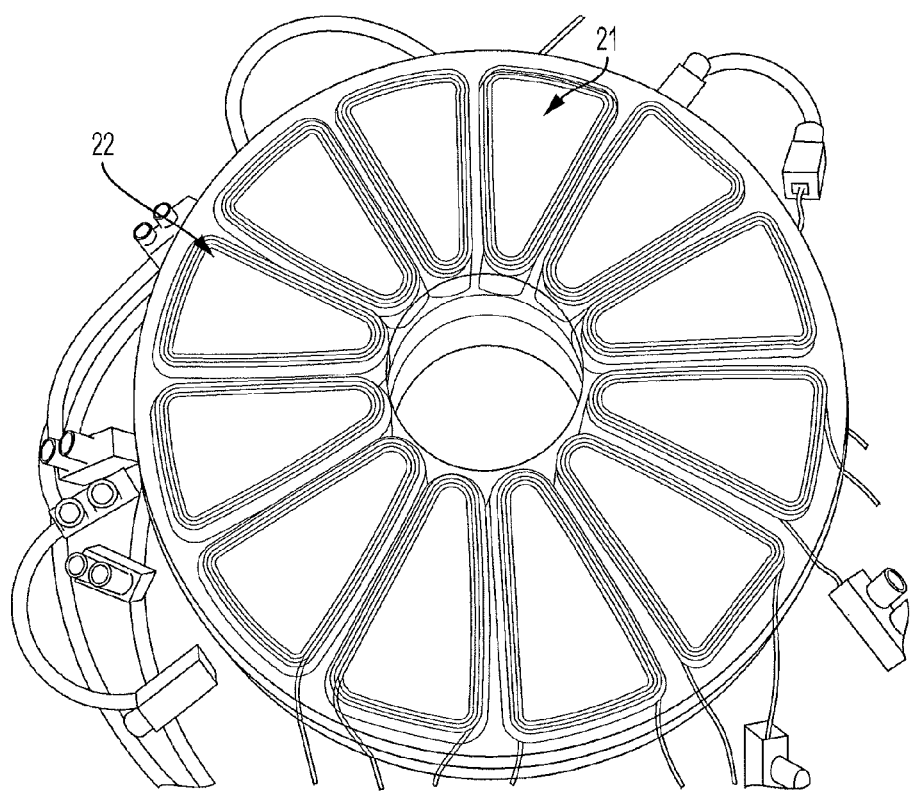
FIG. 2 is a photograph of an example of a stator, having the conventional core configuration as depicted in FIG. 1, with electrical conductor winding 22 and pole piece 21.

In an electrical rotating machine, the energy stored in the gap, Eg, between a rotor surface and stator surface determines the efficiency of the machine. This energy is proportional to $SgB_g^2$ where $B_g$ is the magnetic flux in the gap, S is the pole piece surface area and g is the gap. The force acting between the rotor and the stator, $\partial Eg/\partial g$, is then proportional to $SB_g^2$. Thus to increase the power of an electrical rotating machine, the present inventors came up with the new pole piece surface configuration of FIGS. 3A and 3B was created. With the introduction of the tapered pole piece surface depicted in FIGS. 3A and 3B and FIG. 4, the effective pole piece surface of the core configuration of the conventional core exemplified in FIG. 2 was increased. In order to be able to compare the performance of a motor in accordance with embodiments of the present invention and the conventional motor, two stator cores with the same outside diameter and inside diameter having the same number of pole pieces and slots were built. FIG. 4 and FIG. 2 were the actual stator cores with electrical conductor windings for a motor of an embodiment of the present invention and a conventional motor, respectively. Specific dimensions of the stator cores are given in Example 1 below.

Alternatively, a core with a tapered pole piece intended for a stator or a rotor was realized by winding amorphous metal ribbon by moving the ribbon with a predetermined pitch along the core's axis direction or by axially winding the ribbon followed by the center of the cylinder shaped core being pushed in the axial direction. The tapered surface reflects the predetermined winding pitch. When this core was thus formed, vacuum impregnation using resin was adopted to reinforce the core's mechanical strength. After impregnation, pole pieces were formed by machining by cutting the surface of the core. Prefabricated electrical conductor windings were inserted into the slots between pole pieces. A motor was then assembled utilizing the stator with tapered pole piece surfaces and its matching rotor. In the above process, heat-treatment of the stator core was optional. When the electrical conductor winding was shorted in the stator core, this core could serve as a rotor of an induction motor or generator. In this case, a matching stator core has a concave surface with pole pieces around which electrical conductor windings are placed.

In accordance with an embodiment of the invention, an electrical rotating machine has a stator or a rotor with a core that has a plurality of tapered pole pieces. The core with tapered pole pieces has an outside diameter D, an inside diameter d, a tapered slope or tapered surface that is defined by an angle φ that the tapered slope forms with respect to the horizontal plain as defined in FIG. 3B and the angle φ is being predetermined for a particular core. Each pole piece has an outer side dimension $t_o$ and an inner side dimension of $t_i$, with the plurality of pole pieces being separated by a plurality of slots, each slot having a slot width s and a slot depth sd on the inner circumference of the core. Each pole piece has a height $p_i$ that is measured on the inner circumference of the core, and the height $p_i$ is predetermined for a particular core.

The slots between the pole pieces of the stator or the rotor are filled with electrical conductor windings. Such stator or rotor with electrical conductor windings is matched with a rotor or stator to become the electrical rotating machine of an embodiment of the invention.

The electrical rotating machine has higher output power, higher torque and higher efficiency than its counterpart machine that does not have a core with tapered pole pieces. The details of the output power, torque and efficiency, as illustrated in FIGS. 5-10, will be discussed in detail in the Examples. The improvements of the electrical rotating machine over their counterpart can be at least 30% higher output power, more than 25% higher motor torque, and efficiency exceeding 75%.

Therefore, it is demonstrated above that high power and high efficiencies are achievable in an electrical rotating machine according to embodiments of the present invention. These advantages are not possible for machines with conventional core configurations, such as those in FIGS. 1 and 2. Due to the unique core configuration of the embodiments of the present invention, reduction of a rotating machine's radial dimension becomes possible. This feature makes it feasible to build an electrical rotating machine which must be fit into a limited space, examples of which include motors and generators in transportation equipment such as automobiles and trains, building walls, automotive doors, power tools, fluid moving pumps, appliances driven by motors and the like.

EXAMPLE 1

A toroidally wound core with an inner diameter d and outer diameter D and a height $p_i$ was prepared and heat treated for relieving core winding stress. The wound core was then impregnated by a resin and one of the flat surface of the wound core was machined to introduce tapered surface making an angle φ of FIG. 3B with respect to the original flat surface of the toroidal core. A water-jet nozzle 31 was then placed outside the perimeter of the toroidal core as shown in FIG. 3A and stator pole pieces 33 were built by cutting the core with water jet 32. This process resulted in a stator core 30 with a back-iron 34 on which stator pole pieces 33 were equally spaced on the back iron 34 which served as magnetic flux return path in the stator.

A motor stator core of an embodiment of the present invention as depicted in FIG. 3B had an outside diameter D=110 mm, an inside diameter d=45 mm, a plurality of pole pieces each with an outside width of $t_o$=21 mm and an inside width of $t_i$=38 mm, a plurality of slots each with a slot width s=8 mm, $p_i$=30 mm, slot depth sd=12 mm and a pole piece surface having a taper angle φ=29 degrees. Prewound conductor wire coils 42 was inserted in the stator slots 41 as shown in FIG. 4, completing stator production. A stator core of conventional configuration as depicted in FIG. 2 had the same physical dimensions as those in FIG. 4, except that the taper angle φ=0.

Figure 5:
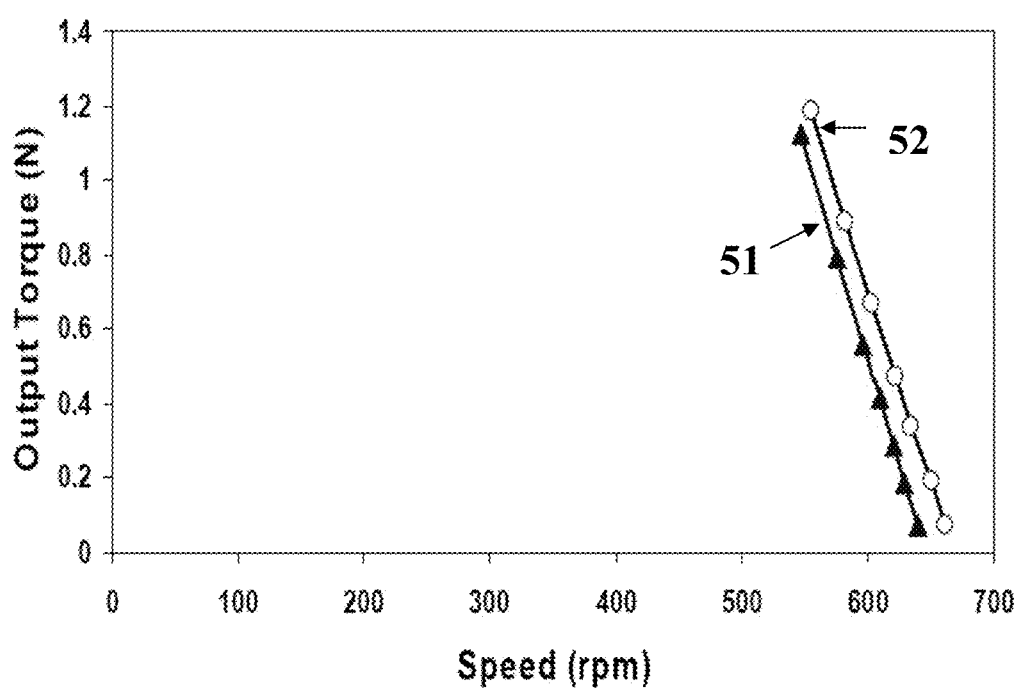
FIG. 5 is a graph comparing the output torque of a motor using a stator of an embodiment of the present invention indicated by line 52, and that of a motor using the conventional stator core of FIG. 2 indicated by line 51 as a function of motor speed.

The motors with stators of FIG. 2 and FIG. 4 were tested in accordance with a conventional dynamometer test method. FIG. 5 compares the output torque versus the motor speed given by curve 52 for a motor of an embodiment of the present invention and that for a conventional motor given by curve 51. From the two curves, 52 and 51, higher output torque was realized as the motor speed increased by adopting a stator core of that embodiment of the present invention. For example, at a motor speed of 600 rpm, it is noticed that an increase of motor torque by about 0.14 N from about 5.2 N was achieved in a motor of an embodiment of the present invention over that of the conventional core which corresponds to an improvement of about 27%.

Figure 6:
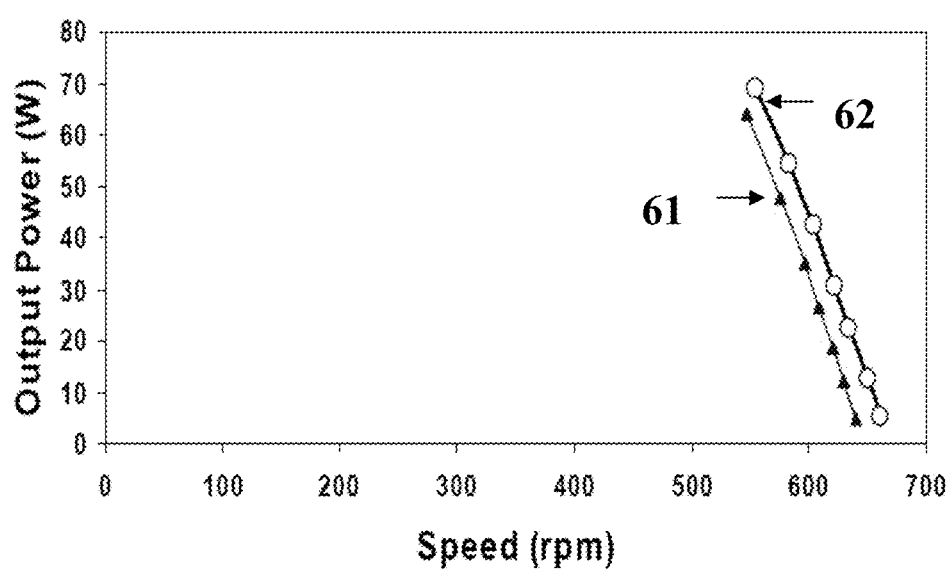
FIG. 6 is a graph comparing the output power of a motor of an embodiment of the present invention indicated by line 62, and that of a motor using the conventional stator of FIG. 2 indicated by line 61 as a function of motor speed.

This is also noted by the significant output power increase shown in FIG. 6. For example, at a motor speed of 600 rpm, the output power from a motor of that embodiment of the present invention given by curve 62 of FIG. 6 was about 53.5 W, which was compared with 33 W generated from a conventional motor, corresponding to an output power increase by about 32% by adopting the pole piece surface configuration for a core according to an embodiment of the present invention.

Figure 7:
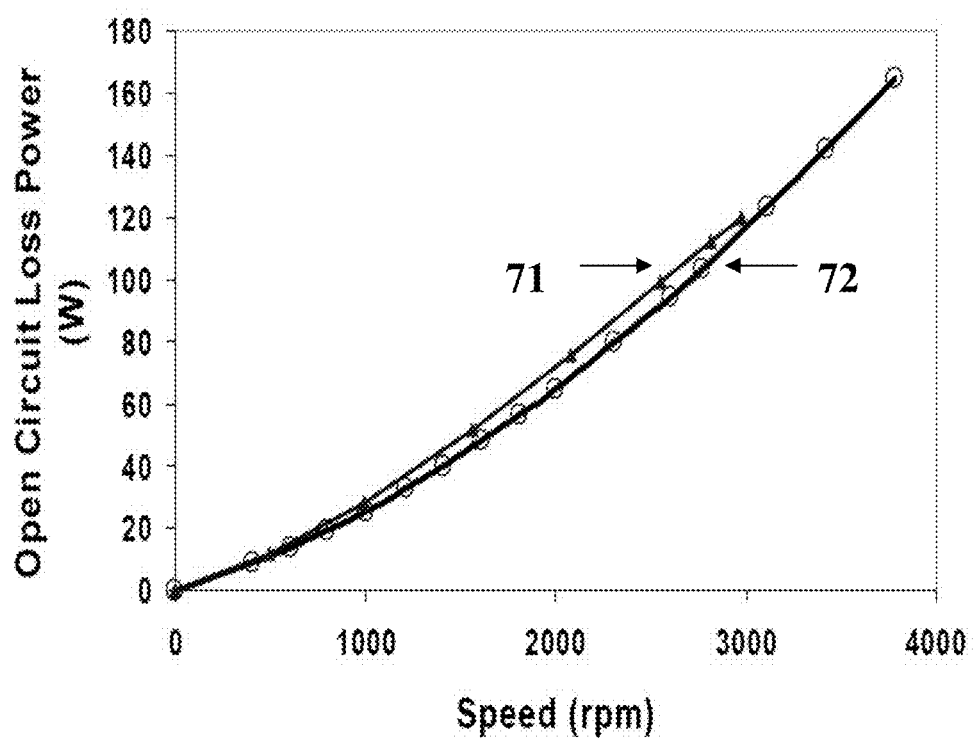
FIG. 7 is a graph comparing the motor speed dependence of an open circuit power loss between a motor of an embodiment of the present invention indicated by curve 72, and that of a motor with a conventional stator of FIG. 2 indicated by curve 71.

FIG. 7 compares the open circuit loss power between a motor of an embodiment of the present invention given by curve 72 and that of the conventional motor given by curve 71. The difference between the two cases is small at lower motor speed, but at higher speeds exceeding 1000 rpm, power loss is considerably lower in a motor of that embodiment of the present invention than that in the conventional motor. For example, at a motor speed of 2500 rpm, FIG. 7 indicates that the power loss is lower by about 5 W in a motor of an embodiment of the present invention compared with a conventional motor. Such decrease is surprising as open circuit loss in motors is equivalent to core loss under no load and is expected to be about the same from two cores with similar physical dimensions.

Figure 8:
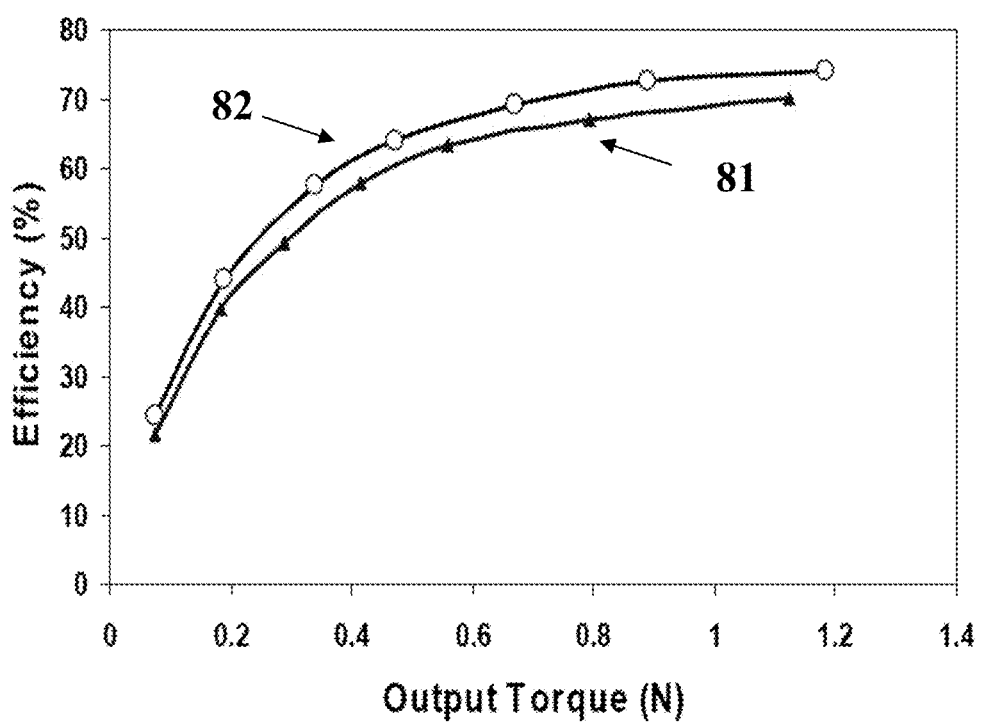
FIG. 8 is a graph comparing motor efficiency versus output torque of a motor of an embodiment of the present invention indicated by curve 82, and that of a motor with a conventional stator of FIG. 2 indicated by curve 81.

Any circuit loss reduction helps to improve the overall efficiency of a motor and FIG. 7 points to higher motor efficiencies achievable in a motor of an embodiment of the present invention, which is demonstrated in FIG. 8. As curves 82 and 81 in FIG. 8 indicated, the efficiency of a motor of an embodiment of the present invention was consistently higher than that of a conventional motor at any given output torque level. For example, the efficiency at output torque of 1 N was about 75% and about 70% for a motor of an embodiment of the present invention and a conventional motor, respectively, according to FIG. 8.

EXAMPLE 2

The following stator core sizes were different from those in Example 1, and were examined and evaluated. The dimension designations were the same as those in FIG. 3B.

Core A: D=110 mm, d=45 mm, sd=17 mm, φ=25 degrees, and $p_i$=30 mm. Core B: D=110 mm, d=45 mm, sd=12 mm, φ=25 degrees, and $p_i$=30 mm. Core C: D=60 mm, d=40 mm, φ=20 degrees, and $p_i$=30 mm. All of these stator cores had twelve (12) slots and ten (10) poles.

Figure 9:
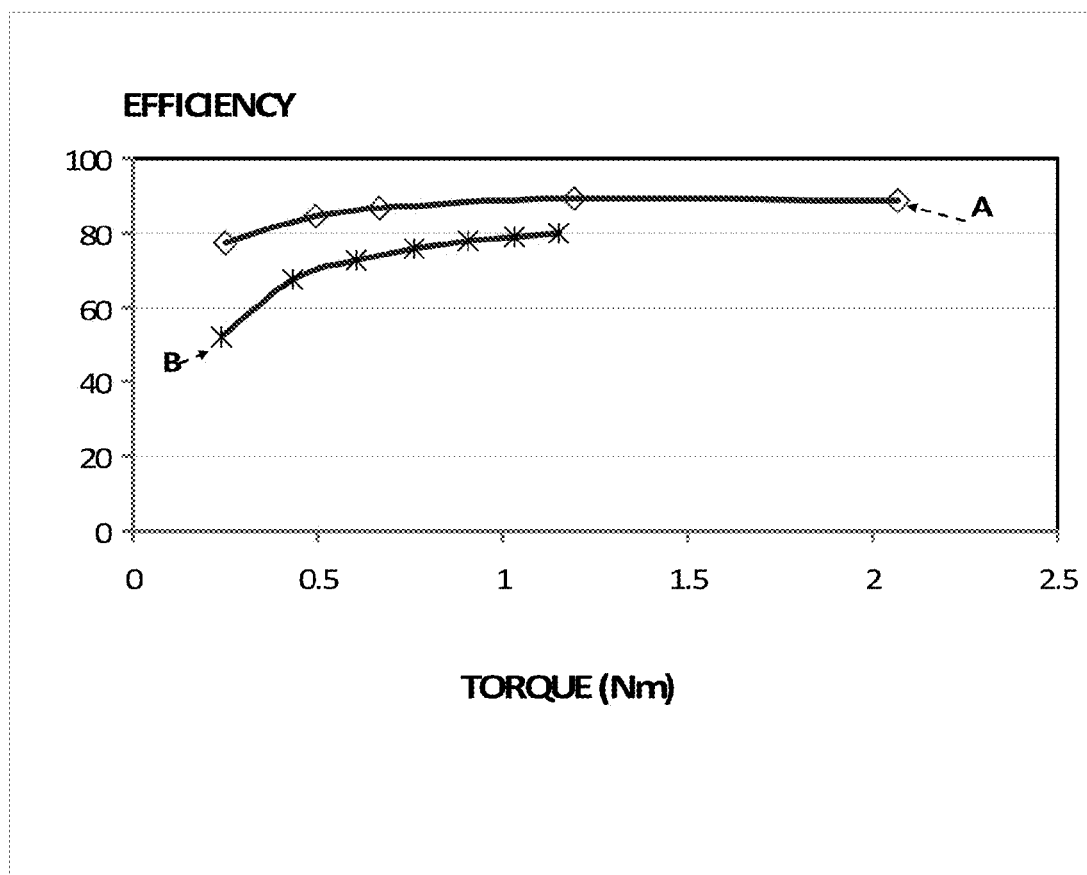
FIG. 9 is a graph showing motor efficiency as a function of motor torque for two motors with different slot depths. Curves A and B are for 12 slot/10 pole motors with a slot depth of 17 mm and 12 mm, respectively. The outer and inner diameter of the stator cores are 110 mm and 45 mm, respectively, and the slot taper angle is 25 degrees.

As shown in FIG. 9, stator Core A showed higher efficiency than stator Core B at all torque levels. Above 1 Nm of torque, Cores A and B reach efficiencies of 90% and 80%, respectively.

Figure 10:
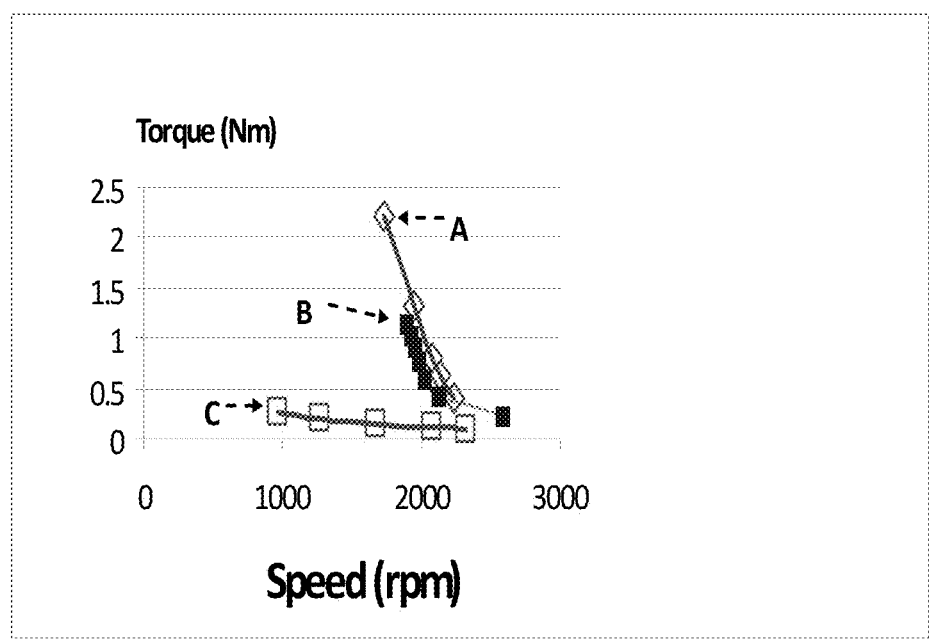
FIG. 10 is a graph showing motor torque as a function of motor speed for three motors with different stator sizes. Curves A and B are for motors with a stator diameter of 110 mm and a taper angle of 25 degrees and slot depths of 17 mm and 12 mm, respectively. Curve C is for a 12 slot/10 pole motor with a stator outer diameter of 60 mm, an inner diameter of 40 mm, a slot depth of 15 mm and a taper angle of 20 degrees.

In FIG. 10, motor torque as a function of motor speed was compared among stator Cores A, B and C. These examples indicated that stator core configurations affected the overall motor efficiency. The general trend was: larger cores with higher degree of pole surface taper angle resulted in higher motor torque and efficiency for a given motor speed.

For example, for embodiments of the invention, cores with tapered pole pieces preferably have the outside diameter in a range of 50 mm-1200 mm, the tapered angle in a range of 10°-45°, and the slot depth in a range of 10 mm-210 mm. The outside diameter of the cores may also be in a range of 50 mm-500 mm, or alternatively 50 mm-150 mm. The tapered angle may also be in a range of 10°-35°, or alternatively 10°-30°. The slot depth may also be in a range of 10 mm-85 mm, or alternatively 10 mm-25 mm. The maximum slot depth is determined by the maximum width which is 214 mm of the amorphous metal ribbon used and with the tapered angle of 10°, the maximum core's outside diameter becomes 1215 mm.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of constructing a core with tapered pole pieces, comprising:
    winding an iron-based amorphous magnetic alloy ribbon concentrically to form a cylinder-shaped toroidal core, said core having an outside diameter, an inside diameter, a first flat side, a second flat side, an outer circumference and an inner circumference;
    heat-treating said cylinder-shaped toroidal core, with or without a magnetic field, at a temperature that is below a crystallization temperature of said ribbon to form a heat-treated core;
    impregnating said heat-treated core with a resin to form an impregnated core;
    machining said first flat side of said impregnated core to form a tapered surface so that said outer circumference is being machined to be shorter than said inner circumference, and said tapered surface is at a taper angle that is measured with respect to said first flat side; and
    machining by cutting said tapered surface to form a plurality of pole pieces, each of said plurality of pole pieces having a height that is measured on said inner circumference, an outer side diameter, and an inner side diameter, each of said plurality of pole pieces being separated in an alternating manner by a plurality of slots, and each of said plurality of slots having a slot width and a slot depth.

2. The method of claim 1, wherein the machining by cutting said tapered surface to form said plurality of pole pieces of is performed by water-jet cutting.

3. The method of claim 1, further comprising:
    inserting electrical conductor windings into said plurality of slots to form a stator or a rotor; and
    matching said stator or said rotor with a matching rotor or a matching stator to form an electrical rotating machine.

4. The method of claim 1, wherein said outside diameter is in a range of 50 mm-1200 mm, said tapered angle is in a range of 10°-45°, and said slot depth is in a range of 10 mm-210 mm.

5. The method of claim 4, wherein said outside diameter is in a range of 50 mm-500 mm, said tapered angle is in a range of 10°-35°, and said slot depth is in a range of 10 mm-85 mm.

6. The method of claim 5, wherein said outside diameter is in a range of 50 mm-150 mm, said tapered angle is in a range of 10°-30°, and said slot depth is in a range of 10 mm-25 mm.

7. A method of constructing a core with tapered pole pieces, comprising:
    winding an iron-based amorphous magnetic alloy ribbon helically to form a cylinder-shaped toroidal core by moving said ribbon with a predetermined pitch along an axis direction of said core, said core having an outside diameter, an inside diameter, a first tapered side, a second tapered side, an outer circumference and an inner circumference;

heat-treating said cylinder-shaped toroidal core, with or without a magnetic field, at a temperature that is below a crystallization temperature of said ribbon to form a heat-treated core;

impregnating said heat-treated core with a resin to form an impregnated core;

machining said first tapered side of said impregnated core to form a tapered surface so that said outer circumference is being machined to be shorter than said inner circumference, and said tapered surface is at a taper angle that is measured with respect to an orthogonal direction of said axis direction of said core; and machining by cutting said tapered surface to form a plurality of pole pieces, each of said plurality of pole pieces having a height that is measured on said inner circumference, an outer side diameter, and an inner side diameter, each of said plurality of pole pieces being separated in an alternating manner by a plurality of slots, and each of said plurality of slots having a slot width and a slot depth.

8. The method of claim 7, wherein the machining by cutting said tapered surface to form said plurality of pole pieces is performed by water-jet cutting.

9. The method of claim 7, further comprising:

inserting electrical conductor windings into said plurality of slots to form a stator or a rotor; and matching said stator or said rotor with a matching rotor or a matching stator to form an electrical rotating machine.

10. The method of claim 7, wherein said outside diameter is in the range of 50 mm-1200 mm, said tapered angle is in the range of 10°-45°, and said slot depth is in the range of 10 mm-210 mm.

11. The method of claim 7, wherein aid outside diameter is in a range of 50 mm-150 mm, said tapered angle is in a range of 10°-30°, and said slot depth is in a range of 10 mm-25 mm.

12. An electrical rotating machine, comprising:

a stator or a rotor with a core having a plurality of tapered pole pieces, said core having an outside diameter, an inside diameter, a tapered surface, a flat side, an outer circumference and an inner circumference, said tapered surface being at a taper angle that is measured with respect to an orthogonal direction of said axis direction of said core, said plurality of tapered pole pieces being separated in alternating manner by a plurality of slots, each of said plurality of pole pieces having a height that is measured on said inner circumference, an outer side diameter, and an inner side diameter, each of said plurality of slots having a slot width and a slot depth, and said core being made from an iron-based amorphous magnetic alloy ribbon.

13. The electrical rotating machine of claim 12, further comprising:

electrical conductor windings inserted into said plurality of slots to form a stator or a rotor having said plurality of tapered pole pieces; and a matching rotor or a matching stator with said stator or said rotor having said plurality of tapered pole pieces.

14. The electrical rotating machine of claim 12, wherein said outside diameter is in a range of 50 mm-1200 mm, said tapered angle is in a range of 10°-45°, and said slot depth is in a range of 10 mm-210 mm.

15. The electrical rotating machine of claim 12, wherein said core has been heat-treated, with or without a magnetic field, at a temperature below a crystallization temperature of said ribbon.

16. The electrical rotating machine of claim 12, wherein said core has been impregnated with a resin.

17. The electrical rotating machine of claim 12, wherein said machine having a higher output power, a higher torque, and a higher efficiency than a machine that does not have tapered pole pieces.

18. The electrical rotating machine of claim 17, wherein said higher output power is at least 30%, said higher torque is at least 25%, and said higher efficiency is greater than 75%.

19. The electrical rotating machine of claim 12, said machine being used as a power train in an automobile.

20. The electrical rotating machine of claim 12, said machine being used in an automobile door.

21. The electrical rotating machine of claim 12, said machine being used in a building wall.

22. The electrical rotating machine of claim 12, said machine being used in a power tool.

23. The electrical rotating machine of claim 12, said machine being used in a fluid moving pump.

24. The electrical rotating machine of claim 12, said machine being used in an appliance driven by a motor.

\* \* \* \* \*

UNITED STATES PATENT AND TRADEMARK OFFICE
CERTIFICATE OF CORRECTION

PATENT NO. : 9,225,205 B2
APPLICATION NO. : 13/750317
DATED : December 29, 2015
INVENTOR(S) : John Andrew Gayler et al.

Page 1 of 1

It is certified that error appears in the above-identified patent and that said Letters Patent is hereby corrected as shown below:

In the claims

Column 8, Line 43, Claim 2
Delete "of is" and insert -- is --, therefor.

Signed and Sealed this
Seventeenth Day of May, 2016

Michelle K. Lee
*Director of the United States Patent and Trademark Office*